United States Patent
Niraula et al.

(10) Patent No.: US 10,484,083 B1
(45) Date of Patent: Nov. 19, 2019

(54) SYSTEMS AND METHODS FOR INTERNET BASED AIRCRAFT COMMUNICATION

(71) Applicant: Rockwell Collins, Inc., Cedar Rapids, IA (US)

(72) Inventors: Madhu S. Niraula, Cedar Rapids, IA (US); Lori J. Sipper, Robins, IA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 29 days.

(21) Appl. No.: 15/673,305

(22) Filed: Aug. 9, 2017

(51) Int. Cl.
| | |
|---|---|
| *H04B 7/185* | (2006.01) |
| *H04L 29/12* | (2006.01) |
| *H04L 29/08* | (2006.01) |
| *H04L 29/06* | (2006.01) |

(52) U.S. Cl.
CPC ..... *H04B 7/18578* (2013.01); *H04L 61/2007* (2013.01); *H04L 61/2592* (2013.01); *H04L 69/04* (2013.01); *H04L 69/325* (2013.01); *H04L 69/326* (2013.01)

(58) Field of Classification Search
CPC ... H04L 69/32; H04L 69/325; H04L 61/2007; H04L 61/2592; H04B 7/18578
See application file for complete search history.

(56) References Cited

U.S. PATENT DOCUMENTS

| | | | | |
|---|---|---|---|---|
| 6,618,397 B1* | 9/2003 | Huang | ............ | H04L 29/06 370/392 |
| 2009/0041041 A1* | 2/2009 | True | ............ | H04B 7/18506 370/401 |
| 2009/0318139 A1* | 12/2009 | Su | ............ | H04B 7/18506 455/431 |
| 2010/0272049 A1* | 10/2010 | Tung | ............ | H04W 88/06 370/329 |
| 2017/0317975 A1* | 11/2017 | Olive | ............ | H04L 9/3247 |

OTHER PUBLICATIONS

ITU; "Introduction to ASN.1"; website http://www.itu.int/en/ITU-T/asn1/Pages/introduction.aspx; Aug. 9, 2017, 7 pages.
Universal-Radio, "ACARS Introduction", http://www.universal-radio.com/catalog/decoders/acarsweb.pdf 5 pages.

(Continued)

*Primary Examiner* — Bo Hui A Zhu
(74) *Attorney, Agent, or Firm* — Donna P. Suchy; Daniel M. Barbieri

(57) ABSTRACT

An aircraft with Internet based communication includes a plurality of communication radios and a processing circuit. The plurality of communication radios are configured to communicate with a ground message manager. The processing circuit is configured to receive a message from a system of the aircraft and encapsulate the received messages into a transport layer segment. The processing circuit is further configured to encapsulate the transport layer segment into an Internet layer packet and add a protocol identifier to the Internet layer packet, the protocol identifier indicating to the ground message manager that the Internet layer packet is an Internet based message. The processing circuit is configured to send the Internet layer packet to the ground message manager via the plurality of communication radios.

20 Claims, 10 Drawing Sheets

(56) References Cited

OTHER PUBLICATIONS

Rockwell Collins, "ARINC Aviation, Aircraft Communications Addressing and Reporting System", https://www.rockwellcollins.com/Services_and_Support/Information_Management/~/media/DA843DB0792946C58740F613328E5022.ashx, 3 pages.

Brain, Marshall, "How Web Servers Work", https://computer.howstuffworks.com/web-server1.htm, downloaded Oct. 9, 2017, 11 pages.

ITU; "Introduction to ASN.1"; http://www.itu.int/en/ITU-T/asn1/Pages/introduction.aspx; downloaded Aug. 9, 2017, 7 pages.

Joshi, Anish, "How TCP/IP protocol works", screenshot of youtube video, https://www.youtube.com/watch?v=8XNas3Nhh9k, Aug. 5, 2016, 1 page.

Tyson, Jeff, "How Internet Infrastructure Works", howstuffworks, https://computer.howstuffworks.com/internet/basics/internet-infrastructure.htm, downloaded Oct. 9, 2017. 9 pages.

Uijt de Haad, Martin, EE6900 Flight Management Systems, "Aircraft Communications and Reporting System", https://web.archive.org/web/20161020231224/http://www.ohio.edu/people/uijtdeha/ee6900_fms_08_acars.pdf 20 pages.

Shichao's Notes, "UNP Chapter 2—The Transport Layer: TCP, UDP, and SCTP", https://notes.shichao.io/unp/ch2/, downloaded Oct. 9, 2017, 12 pages.

\* cited by examiner

```
IpsAPDU ::= SEQUENCE                                                      ⟵ 800
{
    IpsMessage          [0] IpsMessage OPTIONAL, -- application message data
    transmitSequence    [1] SequenceNumber OPTIONAL, -- transmit sequence number
    receiveSequence     [2] SequenceNumber OPTIONAL, -- next sequence number
expected to receive from peer
    compressed          [3] NULL OPTIONAL , -- flag indicating if message is compressed
    moreSegment         [4] NULL OPTIONAL, -- data are framgmented in multiple message
                                -- Last message will have moresegment absent indicating
                                -- last data segment
    cryptoIntegrityCheck   [5] BIT STRING, -- message integrity check based on the session
key, 64 bit HMAC
    ...
}

IpsMessage ::= CHOICE
{
  aCARSMessage    [0]   ACARSMessage,
  atnMessage      [1]   ATNMessage,
  nativeIpMessage [2]   BIT STRING,
  ack             [3]   NULL,
  ...
}
```

FIG. 8A

```
MessageType ::= ENUMERATED
{
 atnB1 (0), -- ATN B1 data
 fans1A (1), - FANS 1/A Data
 acars (2), -- ACARS data
 aoc (3), -- AOC Data
 a623 (4), -- ARINC 623 Data
 nativeIP(5), --Native Internet Application daata
 atnB2 (6),   --ATN Baseline 2 data
 acTracking (7), -- Aircraft postion, speed, and heading data
 ...
}
```

```
ATNMessage ::= SEQUENCE                    ←─800
{
  primitive    [0] AtnDsPrimitive,
  senderConId  [1] ShortValue OPTIONAL,
  receiverConId [2] ShortValue OPTIONAL,
  messageVer   [3] ShortValue OPTIONAL,
  callingPeer  [4] PeerId OPTIONAL,
  calledPeer   [5] PeerId OPTIONAL,
  securityEnable [6] NULL OPTIONAL,
  source       [7] Source OPTIONAL,
  result       [8] Result OPTIONAL,
  qos          [9] OCTET STRING (SIZE (1)) OPTIONAL,
  messageData  [10] BIT STRING OPTIONAL,
  ...
}

ACARSMessage ::= SEQUENCE
{
   addr1     [0] AcarsAddr OPTIONAL, -- label
   addr2     [1] AcarsAddr OPTIONAL, -- Sublabel
   mfi       [2] AcarsAddr OPTIONAL, -- message format identifier
   imi       [3] AcarsAddr OPTIONAL, -- message imi
   smi       [4] AcarsAddr OPTIONAL, -- message smi
   tailNumber [5] AircraftTailNumber OPTIONAL,
   flightId  [6] AircraftFlightId OPTIONAL,
   facility  [7] FacilityName OPTIONAL,
   message   [8] Message OPTIONAL,
   ...
}

AtnDsPrimitive ::= ENUMERATED
{
  startReq (0), -- start request
  startConf (1), - start confirmation
  data (2), -- data request
  endReq (3), -- end request
  endConf (4), -- end confirmation
  abort (5), --abort the connection
  ...
}
```

FIG. 8B

← 800 versionNumber ::= INTEGER (0..255)
SequenceNumber ::= INTEGER (0..32)
ShortValue ::= INTEGER (0.65535)
AcarsAddr ::= IA5String (SIZE (2..4))
AircraftTailNumber ::= IA5String (SIZE (1..8))
AircraftFlightId ::= IA5String (SIZE (2..8))
FacilityName ::= IA5String (SIZE (2..8))
Message ::= BIT STRING
PeerId :: OCTET STRING (SIZE (3..8))

SYSTEMS AND METHODS FOR INTERNET BASED AIRCRAFT COMMUNICATION

BACKGROUND

Embodiments of the inventive concepts disclosed herein relate generally to the field of communication systems. More particularly, embodiments of the inventive concepts disclosed herein relate to communication systems for aircraft.

Many avionics systems in aircraft communicate data to ground stations via the Aircraft Communications Addressing and Reporting System (ACARS) network. The ACARS network may have bandwidth drawbacks and may not natively allow for Internet based messaging. For example, ACARS may use a character oriented protocol. Further, networks such as ACARS are not Internet based and thus do not allow for the benefits of Internet based avionic applications. Many avionics applications such as Pilot Reports (PIREP), Digital Notice to Airmen (NOTAM) (DIGITAM), Significant Meteorological Information (SIGMET), and safety service System Wide Information Management (SWIM) are natively Internet based applications.

SUMMARY

In one aspect, the inventive concepts disclosed herein are directed to an aircraft with Internet based communication. The aircraft includes communication radios and a processing circuit. The plurality of communication radios are configured to communicate with a ground message manager. The processing circuit is configured to receive a message from a system of the aircraft and encapsulate the received messages into a transport layer segment. The processing circuit is further configured to encapsulate the transport layer segment into an Internet layer packet and add a protocol identifier to the Internet layer packet, the protocol identifier indicating to the ground message manager that the Internet layer packet is an Internet based message. The processing circuit is configured to send the Internet layer packet to the ground message manager via the communication radios.

In a further aspect, the inventive concepts disclosed herein relate to a method for Internet based communication for an aircraft. The method includes receiving a message from a system of the aircraft and encapsulating the received messages into a transport layer segment. The method further includes encapsulating the transport layer segment into an Internet layer packet. The method further includes adding a protocol identifier to the Internet layer packet, the protocol identifier indicating to a ground message manager that the Internet layer packet is an Internet based message and sending the Internet layer packet to the ground message manager via communication radios.

In a further aspect, the inventive concepts disclosed herein are directed to a communication system for an aircraft. The system includes an aircraft that includes communication radios, the communication radios being configured to communicate with a ground message manager. The aircraft further includes a processing circuit configured to receive a message from a system of the aircraft and compress the message received from the system of the aircraft. The processing circuit of the aircraft is further configured to encapsulate the compressed message into a transport layer segment a port number, the port number identifying a destination for the compressed message. The processing circuit of the aircraft is configured to encapsulate the transport layer segment into an Internet layer packet and compress the Internet layer packet. The processing circuit is further configured to add a protocol identifier to the compressed Internet layer packet, the protocol identifier indicating to the ground message manager that the Internet layer packet is an Internet based message and send the Internet layer packet to the ground message manager via the communication radios.

BRIEF DESCRIPTION OF THE DRAWINGS

Implementations of the inventive concepts disclosed herein may be better understood when consideration is given to the following detailed description thereof. Such description makes reference to the annexed drawings, which are not necessarily to scale, and in which some features may be exaggerated and some features may be omitted or may be represented schematically in the interest of clarity. Like reference numerals in the figures may represent and refer to the same or similar element, feature, or function. In the drawings:

FIGS. 8A, 8B, and 8C are a code block that defines an Abstract Syntax Notation One (ASN.1) message structure that can be used by the communication manager and the ground message manager of FIG. 1 according to exemplary aspects of the inventive concepts disclosed herein.

DETAILED DESCRIPTION

Figure 1:
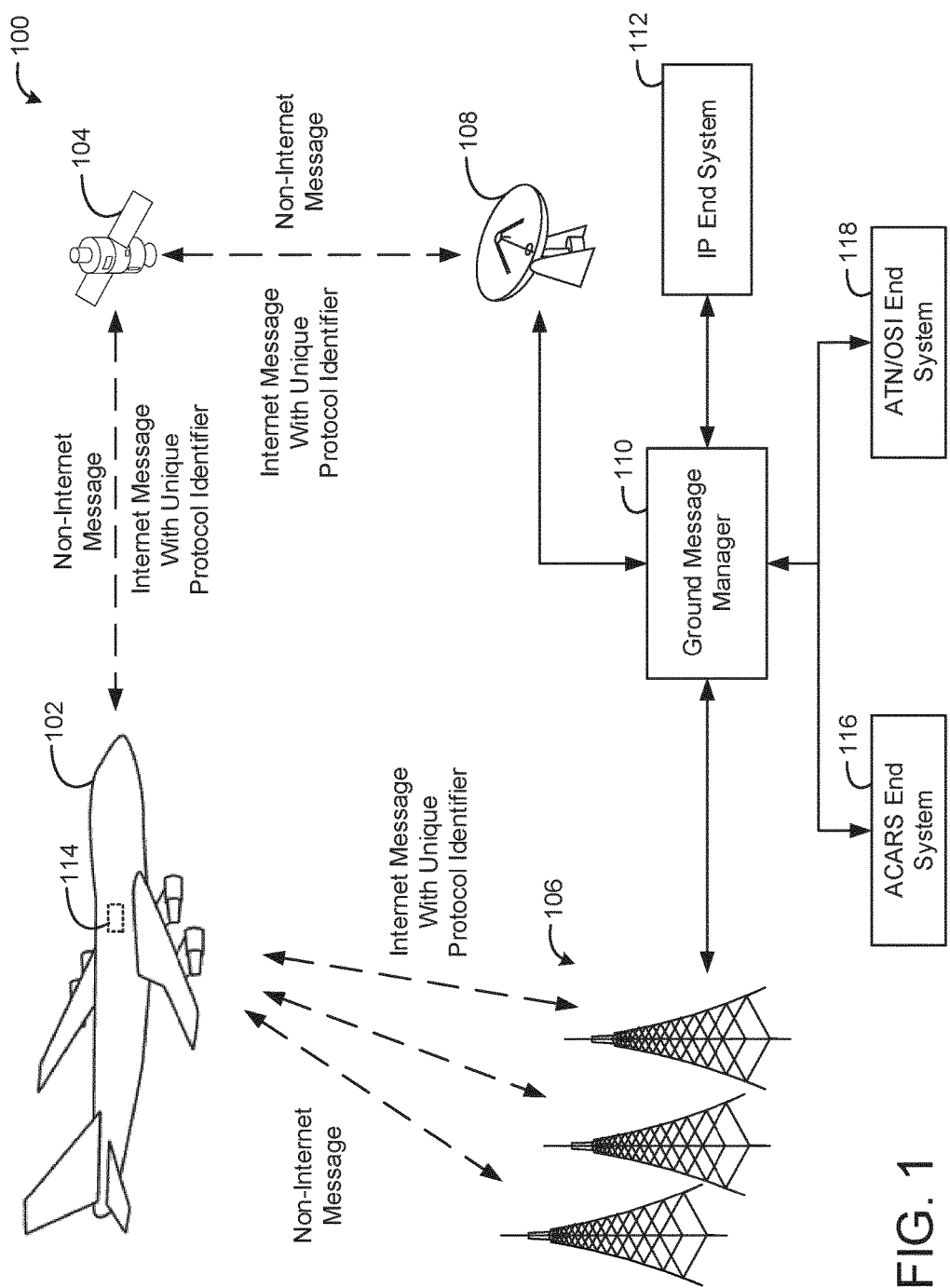
FIG. 1 is a block diagram of an aircraft including a communication manager communicating to both Internet based applications, an ACARS end system (e.g., ARINC 620 hosts or any other ACARS end system), and an ATN/OSI end system via a ground message manager according to exemplary aspects of the inventive concepts disclosed herein.

Before describing in detail the inventive concepts disclosed herein, it should be observed that the inventive concepts disclosed herein include, but are not limited to, a novel structural combination of data/signal processing components, sensors, and/or communications circuits, and not in the particular detailed configurations thereof. Accordingly, the structure, methods, functions, control and arrangement of components, software, and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

Referring generally to the figures, systems and methods for Internet based aircraft communication are described with respect to various aspects of the inventive concepts. The systems and methods advantageously provide Internet communication that can be performed by systems of an aircraft to improve bandwidth efficiency and increase data speeds in communication. Many avionics systems and applications in an aircraft are natively Internet enabled, these systems or applications can be configured to communicate and/or be implemented with Internet based communication. However, other avionics systems or applications in the same aircraft may utilize networks such as ACARS and ATN/OSI and may not natively operate via Internet communication. Further, these applications may not be upgradeable to Internet based communication due to safety concerns. This may cause an aircraft to include both Internet communication and non-Internet communication based avionic systems and applications.

The systems and methods described herein enable an aircraft to communicate via Internet communication. An aircraft may be equipped with a communication manager, according to some embodiments. The communication manager can be configured to utilize both transport layer protocols (e.g., User Datagram Protocol (UDP), Transmission Control Protocol (TCP), and/or Stream Control Transmission Protocol (SCTP)) and Internet layer protocols (e.g., IPv4 and/or IPv6) to communicate data from the aircraft to a ground message manager that is located in a facility on the ground. The communication manager can be configured to include a protocol identifier with each Internet based message it transmits. This protocol identifier may enable the ground message manager to identify that a particular packet of data is part of an Internet based message. In response to identifying a packet of data as an Internet based transmission, the ground message manager can be configured to treat the received packet of data as an Internet based message and provide the Internet based message to the appropriate ground system that the message is destined for.

Many avionics systems in an aircraft, such as safety services, communicate data to ground stations via the Aircraft Communications Addressing and Reporting System (ACARS) network or the Aeronautical Telecommunication Network/Open Systems Interconnection (ATN/OSI). In ACARS, data encoding and encapsulation is character oriented. Each byte of data to be sent in an ACARS message is equivalent to two ACARS characters. The ACARS overhead data is also character oriented. ACARS messages have significant overhead (about 50% overhead) and may use large amounts of network bandwidth.

There are many applications used in avionics systems that are natively IPv6 or IPv4 applications. For example, applications such as Pilot Reports (PIREP), Digital Notice to Airmen (NOTAM) (DIGITAM), Significant Meteorological Information (SIGMET) and safety service System Wide Information Management (SWIM). However, many avionics systems of an aircraft are natively ACARS or ATN/OSI. For example, FMS, ACMS, may be ACARS applications that are not possible to change. This may be due to the cost of such a change and certification requirements.

If an efficient mechanism, such as binary data streams, is used to transfer data from native Internet systems and ACARS systems of an aircraft, more data can be sent over the same link. For this reason, the communication manager of the aircraft can provide a convergence layer to facilitate sending Internet, ACARS, and/or ATN/OSI data via a transport layer protocol (e.g., UPD, SCTP, TCP, etc.) and an internet layer protocol (e.g., IPv4 and/or IPv6) with the existing VOL M2, SATCOM and HF or new communication links. For this reason, a convergence function of the communication manager of an aircraft can perform message convergence to send or receive ACARS, ATN/OSI and Internet based communication for both native Internet systems and other systems (ACARS or ATN/OSI) via an Internet protocol. Using this scheme can free up approximately 40% of the communication bandwidth for an aircraft.

Referring now to FIG. 1, a system 100 for Internet and non-Internet based communication for a communication manager 114 of an aircraft 102 and a ground message manager 110 is shown according to some exemplary embodiments. The communication manager 114 can be configured to facilitate both Internet based communication and non-Internet based communication with the ground message manager 110. In FIG. 1, the aircraft 102 is shown to communicate to ground stations 106. Further, the aircraft 102 is shown to communicate with a satellite 104 which may in turn provide communicate to/from a satellite dish 108. The ground stations 106 may include one or more processing circuits, mission data recorders (MDRs), remote transmitter receivers (RTRs), etc.

In FIG. 1, both non-Internet messages (e.g., ACARS messages) and the messages with the protocol identifier (i.e., the Internet Messages with unique protocol identifiers) are shown to be communicated between the aircraft 102 and the ground message manager 110. The non-Internet messages may be messages for an ACARS end system 116 or for an ATN/OSI end system 118. The Internet messages with the unique protocol identifiers may use transport layer protocols and Internet layer protocols to transmit messages to an IP end system 112, the ACARS end system 116, and/or the ATN/OSI end system 118.

The message with the protocol identifier may include both a packet of data, i.e., the message, and a protocol identifier. The protocol identifier may allow both the communication manager 114 and the ground message manager 110 to identify a message as an Internet based message. The protocol identifier may be a particular piece of data, e.g., a header, that is appended and/or pre-pended to the message. For example, a single byte, e.g., the Hexadecimal number 0x80 may be the protocol identifier. Any number or piece of data can be used as the protocol identifier.

Figure 2:
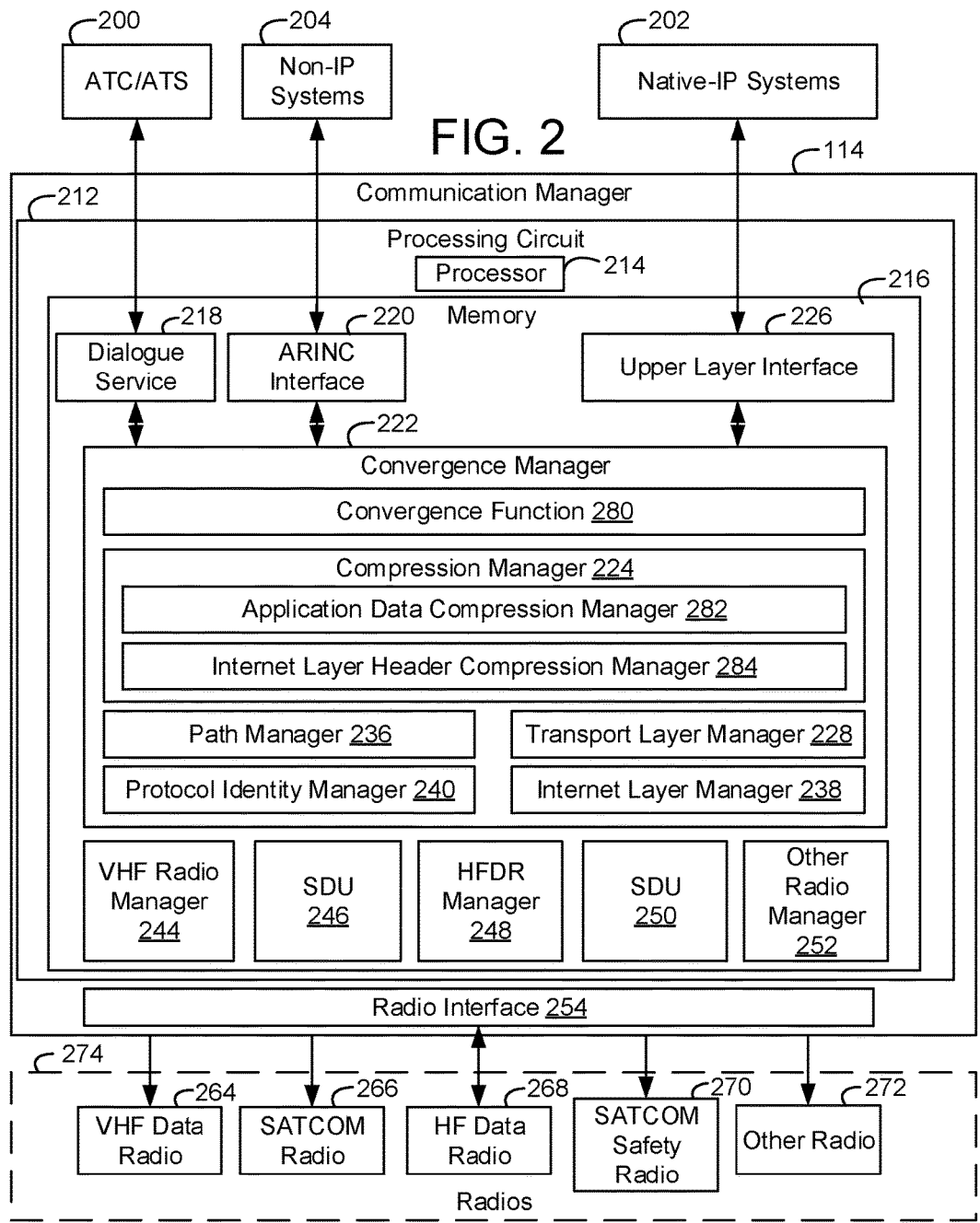
FIG. 2 is a block diagram of the communication manager of the aircraft of FIG. 1 according to exemplary aspects of the inventive concepts disclosed herein.

Referring now to FIG. 2, the communication manager 114 of FIG. 1 is shown in greater detail, according to some exemplary embodiments. The communication manager 114 is shown to be configured to communicate with an ATC/ATS 200, non-IP systems 204, and native-IP systems 202 (e.g., SWIM or other native-IP applications and systems).

The communication manager 114 can be configured to send data from aircraft subsystems, applications, and peripherals, i.e., the ATC/ATS 200, the non-IP systems 204, and the native-IP systems 202, as binary stream messages, using the transport layer protocols (e.g., UPD, SCTP, and/or TCP) and Internet layer protocols (e.g., IPv4 and/or IPv6). The communication manager 114 is shown to communicate with radios 274. The radios 274 include a VHF data radio 264 (e.g., a VHF Data Link Mode 2 radio), a SATCOM radio 266, a HF data radio 268, a SATCOM safety radio 270, and/or any other radio or communication link, as indicated by other radio 272. The binary stream messages can be transmitted by the communication manager 114 via the radios 274 to the ground message manager 110.

The communication manager 114 is shown to include a processing circuit 212, a processor 214, and a memory 216. The processing circuit 212 includes at least one processor 214, which may be any type of general purpose or special purpose processor (e.g., FPGA, CPLD, ASIC). The processing circuit 212 also includes at least one memory 216, which may be any type of non-transitory computer or machine-readable storage medium (e.g., ROM, RAM, hard disk, flash memory).

The memory 216 is shown to include a dialogue service 218 and an ARINC interface 220. The dialogue service 218 can be configured to facilitate communicate between Air Traffic Control (ATC) and Air Traffic Service (ATS), i.e., the ATC/ATS 200, and a convergence manager 222. The ATC/ATS 200 may be ATC and ATS applications or systems of the aircraft 102. The ARINC interface 220 may act as an interface for ARINC based avionic systems and applications i.e., the non-IP systems 204. The ARINC interface 220 may facilitate ARINC communication, e.g., ARINC 619, for communication between the communication manager 114 and the non-IP systems 204.

The non-IP systems 204 may include Flight Management System (FMS), Aircraft Condition Monitoring System (ACMS), Cabin Management System (CMS), Airline Operational Control (AOC) based systems, On Board Maintenance System (OMS), Digital Flight Acquisition System (DFADU), various peripherals, various cabin systems, and/or any other system that may not be natively an Internet system but rather communicate via ACARS or ATN/OSI. The non-IP systems 204 may communicate via ARINC 623, ARINC 619, and/or any other ARINC based communication protocol. The ARINC interface 220 can be configured to facilitate communicate between the convergence manager 222 and the non-IP systems 204.

Since the dialogue service 218 and the ARINC interface 220 facilitate communication between the convergence manager 222 and the ATC/ATS 200 and the non-IP systems 204, no existing systems (e.g., avionics) of the aircraft 102 would be replaced with Internet communication based systems (e.g., the native-IP systems 202). In various embodiments, the avionics systems may receive software updates for properly communicating with the communication manager 114.

An upper layer interface 226 can be configured to act as an interface for the native-IP systems 202. The upper layer interface 226 can be configured to receive messages for the native-IP systems 202 and provide the messages to the convergence manager 222. The convergence manager 222 can be configured to receive messages from the ATC/ATS 200, the non-IP systems 204, and/or the native-IP systems 202 (e.g., directly from the dialogue service 218, the ARINC interface 220, and/or the upper layer interface 226) and provide the messages to the various components of the convergence manager 222.

The convergence manager 222 is shown to include a convergence function 280. The convergence function 280 can be configured to receive messages from the ATC/ATS 200, the non-IP systems 204, and/or the native-IP systems 202 e.g., from dialogue service 218, ARINC interface 220, and/or upper layer interface 226. The convergence function 280 can be configured to perform any data conversion necessary to prepare the message to be encapsulated as a transport layer segment and/or Internet layer packet to be sent to the ground message manager 110. Further, the convergence function 280 can be configured to convert any messages received from the ground message manager 110 into a format that can be provided to the ATC/ATS 200, the non-IP systems 204, and/or the native-IP systems 202.

The convergence function 280 can be configured to pack the received messages into Abstract Syntax Notation One (ASN.1) format. Specifically, the convergence function 280 can be configured to pack messages that the application data compression manager 282 has compressed into ASN.1 format. ASN.1 is a formal notation used for describing data transmitted by telecommunications protocols, regardless of language implementation and physical representation of data. This may allow the convergence function 280 to convert messages from an IP message format, an ACARS message format, and/or an ATN/OSI message format into a particular ASN.1 format. Further, the convergence function 280 can be configured to convert the ASN.1 message to an IP message format, an ACARS message format, and/or an ATN/OSI message format.

The convergence function 280 can be configured to encode the ASN.1 message using ASN.1 unaligned packet encoding rules. Referring to FIGS. 8A, 8B, and 8C, code block 800 illustrates the format of the ASN.1 based message that the convergence function 280 can be configured to use. In response to receiving a message in a native Internet protocol (e.g., a message from the native-IP systems 202), an ACARS message, and/or an ATN/OSI based message (e.g., from non-IP systems 204), the convergence function 280 can pack the message into ASN.1 format.

The ASN.1 message formatted by the convergence function 280 may be the message that is encapsulated into a transport layer segment by the transport layer manager 228 and into an Internet layer packet by the Internet layer manager 238. Compression manager 224 can be configured to compress both the transport layer header and/or the Internet layer header of the message. Further, the convergence function 280 can be configured to convert received messages in a similar manner. Messages that are received from the ground message manager 110 by the radios 274 that are in the ASN.1 format can be converted from the ASN.1 format into an ACARS, ATN/OSI, or IP based format based on the destination of the message or type of the message.

Received data that is in an ASN.1 format that is decompressed by the compression manager 224 can be converted into an appropriate format to be sent to the non-IP systems 204 or the native-IP systems 202. If the end destination of the message is an ACARS system, the convergence function 280 can be configured to convert the received ASN.1 format message to an ACARS message format and send the ACARS based message to the ACARS end system (e.g., the non-IP systems 204). If message type is an ATN/OSI message format, the convergence function 280 can be configured to convert the ASN.1 format message to an ATN/OSI message format and send the ATN/OSI based message to an ATN/OSI end system (e.g., the non-IP systems 204). If the message is destined for an IP based end system, the convergence function 280 can be configured to forward the message to the native Internet application.

The ground message manager 110 can be configured to perform the same functionality as the convergence function 280. Any ACARS, ATN/OSI, or IP based messages that the ground message manager 110 sends to the aircraft 100 can be converted into an ASN.1 format by the ground message manager 110. The ground message manager 110 can use the same ASN.1 code block, i.e., the code block 800 as described with reference to FIGS. 8A, 8B, and 8C to format messages. The ground message manager 110 can be configured to convert received messages from aircraft 100 that are in the ASN.1 format to an end destination format, e.g., into an ATN/OSI message format if the message is destined for the ATN/OSI end system 118, into an ACARS message format if the message is destined for the ACARS end system 116.

The convergence manager 222 is shown to include a compression manager 224. The compression manager 224 can be configured to compress and/or decompress various messages and/or pieces of data. The compression manager 224 can be configured to use any kind of lossy or lossless compression algorithm to compress various messages (e.g., RFC 3173, RFC3749, RFC 4994, etc.). The compression manager 224 can be configured to compress any messages received from the ATC/ATS 200, the non-IP systems 204, and/or the native-IP systems 202. The compression manager 224 can be configured to compress any transport layer segment or datagram generated by a transport layer manager 228 and can further be configured to compress any Internet layer data packet generated by an Internet layer manager 238. The compression manager 224 can further be configured to perform any kind of transport layer or Internet layer header compression or decompression.

The compression manager 224 is shown to include application data compression manager 282 and Internet layer header compression manager 284. The application data compression manager 282 and the Internet layer header compression manager 284 can be configured to perform specific compression and/or decompression functions of compression manager 224. For example, the application data compression manager 282 can be configured to compress any data that the convergence manager 222 receives from ATC/ATS 200, non-IP systems 204, and/or native-IP systems 202. Further, the application data compression manager 282 can be configured to decompress any messages that the convergence manager 222 receives from the ground station 110. Specifically, if the convergence manager 222 receives an Internet layer packet from the ground message manager 110, the application data compression manager 282 can be configured to decompress the data of the transport layer segment.

The application data compression manager 224 can be configured to selectively compress the messages it receives. For example, the application compression manager 224 can be configured to compress the received message and then compare the size of the compressed message to the size of the uncompressed version of the message. If the application compression manager 224 determines that the size of the uncompressed message is smaller than the size of the compressed message (or in some embodiments the same size), the application data compression manager 224 can be configured to forego compressing the message. In response to determining that the compressed message is smaller than the uncompressed message, the application data compression manager 224 can be configured to retain the compressed version of the message and set an indication in the message which identifies that the message is compressed. Received messages may have an identifier which identifies whether the message is compressed or uncompressed. Based on the identifier, the application data compression manager 282 can be configured to determine whether decompression of the received message is necessary. In response to determining that decompression is necessary, the application data compression manager 282 can be configured to perform decompression. In response to determining that decompression is unnecessary, the application data compression manager 282 can be configured to forego decompression.

The data that the application data compression manager 282 either compresses or decompresses can be formatted by the convergence function 280. The convergence function 280 can format the message into an ASN.1 format before the message is encapsulated as a transport layer segment and an Internet layer packet. The ASN.1 formatted message may include the identifier (e.g., a flag) which identifies whether the message of the ASN.1 formatted message is compressed or was left uncompressed. This allows the receiving system (e.g., the ground message manager 110) to determine whether to compress or decompress the received message. The ground message manager 110, specifically, the application data compression manger 342 can be configured to perform some and/or all of the functionality of the application data compression manager 282. Specifically, the application data compression manger 342 can be configured to determine whether to compress or decompress messages.

Regarding the Internet layer header compression manager 284, the Internet layer header compression manager 284 can be configured to perform compression and/or decompression of Internet layer packets that will be transmitted to and/or received from the ground message manager 110. Specifically, the Internet layer header compression manager 284 can be configured to compress and/or decompress Internet layer headers included in the Internet layer packets. For example, the Internet layer header compression manager 284 can perform various header compression and decompression methods e.g., RFC 3095 and/or any other header compression and decompression method. Any Internet layer packet that the convergence manager 222 is sending to the ground message manager 110 that includes a header can be compressed by the Internet layer header compression manager 284. Similarly, any Internet layer packet that includes an Internet layer header that is received by convergence manager 222 from ground message manager 110 can have its Internet layer header decompressed by the Internet layer header compression manager 284.

The transport layer manager 228 can be configured to perform transport layer protocols (e.g., TCP, SCTP, UDP, etc.). The transport layer manager 228 can be configured to utilize port numbers for the ATC/ATS 200, the non-IP systems 204, and/or the native-IP systems 202 to facilitate communication between the ATC/ATS 200, the non-IP systems 204, and/or the native-IP systems 202 and the ground message manager 110. The transport layer manager 228 can be configured to add a port number to any message to be sent to the ground message manager 110. The transport layer manger 228 may store one or more lookup tables or other data structures, e.g., Table 1, which indicate port numbers associated with various systems of the aircraft 102 (e.g., the ATC/ATS 200, the non-IP systems 204, the native-IP systems 202) and systems on the ground (e.g., the IP end system 112, the ACARS end system 116, the ATN/OSI end system 118). The port number may identify particular systems or may otherwise identify a type of data. Table 1 indicates transport layer port numbers and associated services. The transport layer ports may be any transport layer port e.g., UDP port, TCP port, and/or SCTP port.

TABLE 1

Port Number And Services

| Service Name | Port Number |
| --- | --- |
| Authentication | 63300 |
| Airline Operational Control (AOC)/ ACARS End System | 63301 |
| Aeronautical Telecommunication Network (ATN) CM | 63302 |
| ATN Controller-Pilot Data Link Communications (CPDLC) | 63303 |
| ATN Automatic Dependent Surveillance-Contract (ADS-C) | 63304 |
| Future Air Navigation System (FANS) CPDLC | 63305 |
| FANS ADS-C | 63306 |
| FANS AFN | 63307 |
| ARINC 623 (ATS, etc.) | 63308 |
| Other Applications (e.g., Native Internet Based Applications) | All Other Ports |

As an example, the convergence manager 222 may receive a message from the radios 274. A protocol identity manager 240 may identify, via a protocol identifier included in the message, that the message is an Internet based message. The transport layer manager 228 can determine, via a port number included in a transport layer segment of the Internet based message, that the message is destined for a particular system. For example, if the port number is 63301, the transport layer manager 228 may determine that the message is Airline Operational Control (AOC)/ACARS and may provide the AOC/ACARS message to a system (e.g., the non-IP systems 204) that manages AOC/ACARS messages.

The transport layer manager 228 can be configured to encapsulate a message received from the ATC/ATS 200, the non-IP systems 204, and the native-IP systems as UDP datagrams, SCTP datagrams, or TCP segments and/or compressed by the compression manager 224. Encapsulating the message as a transport layer packet may include adding a transport layer header (e.g., a UDP header, a SCTP header, a TCP header). Encapsulating the message may include, for the example of UDP, adding a source port number (e.g., a port number as in Table 1), a destination port number (e.g., a port number as in Table 1), a length indicator, and/or a checksum. The terms segments and datagrams may be used interchangeably herein to refer to transport layer data. The transport layer manager 228 may be configured to facilitate other transport layer protocols e.g., UPD-Lite, Multipath TCP, Datagram Congestion Control Protocol (DCCP), and/or Reliable User Datagram Protocol (RUDP).

A path manager 236 can be configured to select between a plurality of communication links to transmit a message from the ATC/ATS 200, the non-IP systems 204, and the native-IP systems 202. In some embodiments, the communication links are the VHF data radio 264, the SATCOM radio 266, the HF data radio 268, the SATCOM safety radio 270, and the other radio 272. In various embodiments, the path manager 236 performs load balancing to select one or more of the radios to transmit the message. The path manager 236 may select two or more of the radios to send the same message. This may ensure data integrity by creating redundancy in the transmitted messages.

The Internet layer manager 238 can be configured to perform all Internet layer protocols. In some embodiments, the Internet layer manager 238 can be configured to encapsulate any UPD datagram, SCTP datagram, or TCP segment into an Internet protocol layer packet. In some embodiments, the Internet protocol layer packet is a IPv4 packet, an IPv6 packet, and/or any other Internet layer packet. The Internet layer manager 238 can be configured to add a network address (e.g., an IP address) the datagram or segment received from the transport layer manager 228 that identifies a network that the message needs to be delivered to, the network being the network that includes the particular port number as identified by the datagram or segment. Encapsulating data as an Internet layer packet may include adding an Internet layer header to the data. For the example of IPv6, encapsulating data may include adding a version identifier, a traffic class identifier, a flow label, a payload length, a next header, a hop limit, a source address, and a destination address.

The protocol identify manager 240 can be configured to add a protocol identifier to the Internet layer packet generated by the Internet layer manager 238. In some embodiments, the protocol identifier is appended and/or prepend to the Internet layer packet. The protocol identifier may be a number or value e.g., 0x80. This may identify the Internet layer packet as an Internet based message. Further, the protocol identify manager 240 can be configured to identify a protocol identifier included in a message received from the radios 374 i.e., from the ground message manager 110.

A VHF radio manager 244 may be a manager for the VHF data radio 264. The VHF radio manager 244 can implement an ARINC protocol e.g., ARINC 750. In some embodiments, the VHF data radio 264 communicates with the VHF radio manager 244 via a radio interface 254. The VHF data radio 264 may communicate via ARINC 429 with the radio interface 254. The VHF radio manager 244 can be configured to communicate via ARINC 429 with the VHF data radio 264.

A satellite data unit (SDU) 246 can be configured to process all data to be sent or received via the SATCOM radio 266. Likewise, a SDU 250 may be configured to process all data to be sent or received via the SATCOM safety radio 270. A HFDR manager 248 can be configured to process data to be sent or received via the HF data radio 268 while other radio manager 252 can be configured to process any data to be sent or received via the other radio 272.

The radio interface 254 may be the physical interface by which the communication manager 114 communicates with the radios 274. The radio interface 254 may facilitate any kind of ARINC communication (e.g., ARINC 429) or Ethernet communication to allow the radios 274 to communicate with the communication manager 114. The radio interface 254 may include one or more circuits and/or connections that electrically connect the radios 274 to the communication manager 114.

Figure 3:
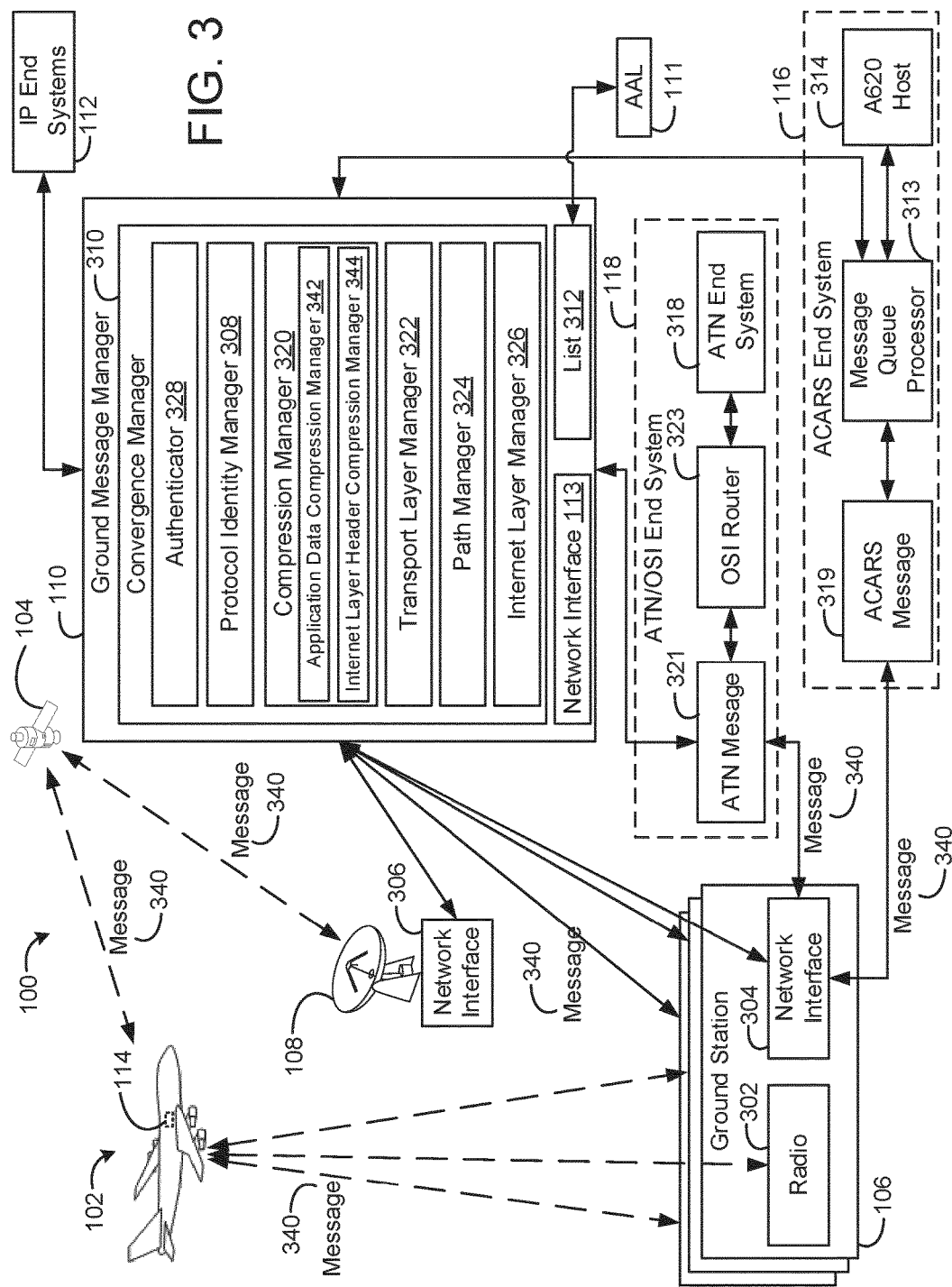
FIG. 3 is a block diagram of the ground message manager of FIG. 1 in greater detail according to exemplary aspects of the inventive concepts disclosed herein.

Referring now to FIG. 3, the system 100 is shown in greater detail, according to an exemplary embodiment. The Aircraft 102 is shown to send messages to the ground message manager 110 via the satellite 104 and the satellite dish 108 and/or via the ground stations 106. The ground stations 106 are shown to include radio 302 and network interface 304. The radio 302 can be a radio configured to communicate to the aircraft 102. The radio 302 can be similar to VHF data radio 264 and HF data radio 268. The radio 302 can be configured to communicate to HF data radio 264 and/or HF data radio 268 of the aircraft 102. The network interface 304 can be configured to facilitate communication between ground message manager 110, the ATN/OSI end system 118, and/or the ACARS end system 116. The network interface 304 can include one or more routers, network switches, processing circuits, that can be configured to facilitate communication. The messages that the ground message manager 110 receives from the ground stations 106 and the satellite dish 108 may include a protocol identifier. Based on the protocol identifier, a protocol identity manager 308 of the ground message manager 110 can be configured to identify the message as an Internet based message.

In FIG. 3, the aircraft 102 is shown to send and receive messages, indicated by a message 340. The message 340 can be a message transmitted and/or received by the ground station 106, the satellite dish 108, and/or the satellite 104. Further, the message 340 can be transmitted and/or received by radios of the aircraft 102. In some embodiments, the message 340 is a message that includes a protocol identifier identifying the message 340 as an Internet based message. The message 340 can be transmitted as an aviation VHF link control (AVCL) frame that includes an AVLC Unnumbered Information Frame (UI) and/or any other info frame. The message 340 may be a general station information frame (GSIF). The message 340 may be an ACARS message sent via AVLC i.e., ACARS over AVLC (AoA). The message 340 may be an ATN/OSI message sent via AVLC. The message can be sent or received over any other communication link beyond VHF. The message can be sent or received via new forms of SATCOM or other air to ground links.

The ground message manager 110, as described with further reference to FIG. 1, may be the same and/or similar to the communication manager 114 as described with reference to FIGS. 1-2. For example, the ground message manager 110 may include one or more processing circuits that include one or more processors and memory units (e.g., the processing circuit 212, the processor 214, the memory 216). The ground message manager 110 is shown to include a convergence manager 310, an authenticator 328, the protocol identity manager 308, a compression manager 320, a transport layer manager 322, a path manager 324, and an Internet layer manager 326. Compression manager 320 is shown to include an application data compression manager 342 and an Internet layer header compression manager 344. These components may be memory components whose functionality is executed on a processing circuit of the ground message manager 110. Further, these components may be the same as and/or similar to the components of the communication manager 114 as described with reference to FIG. 2 and elsewhere herein.

Specifically, the protocol identity manager 308 may include some and/or all of the functionality of the protocol identity manager 240 as described with reference to FIG. 2 and elsewhere herein. The compression manager 320 may include some and/or all of the functionality of the compression manager 224 as described with reference to FIG. 2 and elsewhere herein. Further, the application data compression manager 342 and the Internet layer header compression manager 344 may include some and/or all of the functionality of the application data compression manager 282 and the Internet layer header compression manager 284 as described with reference to FIG. 2 and elsewhere herein. Likewise, the transport layer manager 322 and the Internet layer manager 326 may include some and/or all of the functionality of the transport layer manager 228 and the Internet layer manager 238 as described with reference to FIG. 2 and elsewhere herein. The path manager 324 may include some and/or all of the functionality of the path manager 236 as described with reference to FIG. 2 and elsewhere herein.

The ground message manager 110 is shown to include a network interface 113. The network interface 113 can be one or more processors, memory units, processing circuits, network switches, routers, or other components necessary for communication. The network interface 113 may be the same and/or similar to network interface 306 of the satellite dish 108 and the network interfaces 304 of the ground stations 106. These network interfaces may enable the ground message manager 110, the ground stations 106, and the satellite dish 108 to communication among each other and with the IP end systems 112, the ATN/OSI end system 118, and/or the ACARS end system 116.

The convergence manager 310 of the ground message manager 110 may include some and/or all of the functionality of the convergence manager 222 as described with reference to FIG. 2. In response to determining, via the protocol identity manager 308, that a message received from the ground stations 106 and/or the satellite dish 108 includes the protocol identifier, the convergence manager 310 can be configured to perform decompression of the message via the compression manager 320 (e.g., decompress an Internet layer header of the message by the Internet layer header compression manager 344 and/or decompress the message i.e., the data of the transport layer segment of the message by the application data compression manager 342) and provide, via the transport layer manager 322, the decompressed message to the IP end systems 112 based on a port number included in the transport layer datagram or segment. Further, the transport layer manager 322 can provide the message to the ATN/OSI end system 118 or the ACARS end system 116 based on the port number included in the transport layer datagram or segment of the message. In identifying which end system to send the message, the transport layer manager 322 may use a lookup table or other data structure that associates systems with port numbers (e.g., Table 1).

Further, the convergence manager 310 can be configured to receive a message to send to the aircraft 102 from the ATN/OSI end system 118 and/or the ACARS end system 116 (e.g., an ARINC 620 based message). The convergence manager 310 can be configured to compress, via the compression manager 320, the message (e.g., compress the message via application data compression manager 342), encapsulate, via the transport layer manager 322, the message as a transport layer datagram or segment, encapsulate via the Internet layer manager 326, the message as an Internet layer packet, compress the Internet layer packet via the compression manager 320 (e.g., compress the Internet layer packet via compression manager 320 and/or compress the header of the Internet layer packet via the Internet layer header compression manager 344) and cause the ground stations 106 and/or the satellite dish 108 to transmit the Internet layer packet to the aircraft 102. The convergence manager 310 can select, via the path manager 324, multiple communication links to utilize when transmitting the message. The convergence manager 310 can send the Internet layer packet via the selected communication links, creating message redundancy. The communication manager 114 of the aircraft 102 can be configured to de-duplicate the duplicated messages.

Further, the convergence manager 310 can be configured to de-duplicate multiple messages received from more than one communication link via the path manager 324. The convergence manager 310 can be configured to identify that it has received a plurality of the same messages. The convergence manager 310 can be configured to discard any subsequent duplicate messages it receives after receiving a first of the duplicate messages.

The ground message manager 110 is shown to include a list 312. The list 312 may be a list of authenticated aircraft that the ground message manager 110 can communicate with. The list 312 may be updated periodically based on an authenticated aircraft list (AAL) 111. The AAL 111 may be a database of authenticated aircraft. The authenticated aircraft may be aircraft that are currently airborne. Once an aircraft lands, the aircraft may be removed from the AAL 111. The first time that the ground message manager 110 communicates with a particular aircraft, the authenticator 328 can be configured to authenticate the aircraft and then add the aircraft to the AAL 111 and/or the list 312. When an aircraft lands, the authenticator 328 may remove the aircraft from the list 312 and may re-authenticate the aircraft the next time the aircraft is airborne and communicating via the ground message manager 110.

In some embodiments, the aircraft authenticates via one or more communication links (e.g., SATCOM, VHF, etc.). The list 312 may include a list of communication links that the aircraft is utilizing. Thus the path manger 324 may only communicate with the aircraft via the communication links that are authenticated. Similarly, the aircraft may only communicate via communication links it has authenticated.

In response to determining, via the transport layer manager 322, that a message is destined for an A620 host 314 of ACARS end system 116, the convergence manager 310 can be configured to convert the message into ARINC 620 format or another format appropriate for ACARS end system 116 (e.g., an ACARS message 319) and provide the message to a message queue processor 313 which can provide the message to the A620 host 314. Similarly, in response to determining that a message is destined for an ATN end system 318, the convergence manager 310 can be configured to provide the message in ATN format (e.g., an ATN message 321) to an OSI router 323 which can provide the ATN message to the ATN end system 318. The ATN end system 318 may be one or more systems e.g., ATN Open System Interconnection (OSI) systems.

Figure 4:
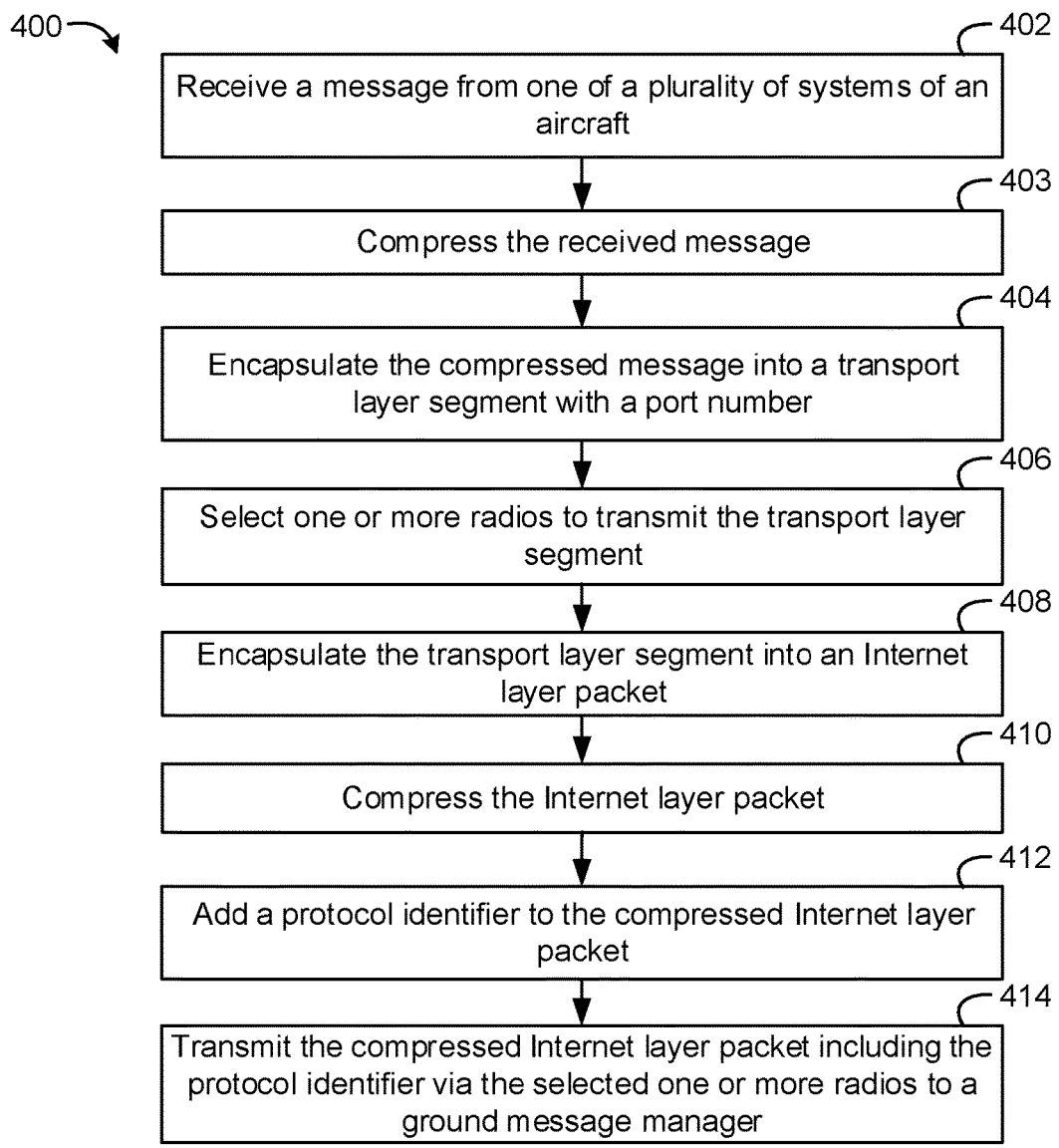
FIG. 4 is a flow diagram of a process for transmitting Internet based messages from the aircraft of FIG. 1 to the ground message manager of FIG. 1 according to exemplary aspects of the inventive concepts disclosed herein.

Referring now to FIG. 4, a process 400 is shown for receiving a message from a system of the aircraft 102 and transmitting the message via the radios 274 according to some exemplary embodiments. The communication manager 114 can be configured to perform the process 400. Further, any device or system described herein can be configured to perform the process 400.

In step 402, the communication manager 114 can receive a message via one of a plurality of systems, the ATC/ATS 200, the non-IP systems 204, and/or the native-IP systems 202. The message may be received by the dialogue service 218, the ARINC interface 220, and/or the upper layer interface 226. The received message may be provided to the convergence manager 222. In step 403, the compression manager 224 can be configured to compress the message received in the step 402. In some embodiments, the application data compression manager 282 of the compression manager 224 can be configured to compress the message.

In step 404, the transport layer manager 228 can be configured to encapsulate the message received in the step 402 into a transport layer segment. The transport layer segment may include a port number. The port number may identify a particular end destination for the message. The transport layer manager 228 can use a table similar to Table 1 when determining the appropriate port number to append and/or prepend to the transport layer segment and/or include in a header of the transport layer segment. The port number may identify an end ground system that the message is destined for.

In step 406, the path manager 236 can select one or more radios of the radios 274 to transmit the message. In some embodiments, the path manager 236 selects two or more of the radios 274 to create message redundancy. The path manager 236 select the radios 274 in order to properly load balance the radios 274.

In step 408, the Internet layer manager 238 can encapsulate the transport layer segment into an Internet layer packet. In some embodiments, the Internet layer manager 238 can encapsulate the transport layer segment into an IPv4 or IPv6 packet. In some embodiments, encapsulating the transport layer segment into an Internet layer packet includes adding (e.g., appending or prepend) an IP address to the transport layer segment (e.g., adding an Internet layer header).

In step 410, the compression manager 224 can compress the Internet layer packet. This second compression may minimize the size of the Internet layer packet. In some embodiments, compressing the Internet layer packet includes compressing an Internet layer header of the Internet layer packet by the Internet layer header compression manager 284 of the compression manager 224. In step 412, the protocol identity manager 240 can add (e.g., append and/or prepend) an protocol identifier to the compressed Internet layer packet. The protocol identifier may be a value that identifies that the compressed Internet layer packet is an Internet based message. In some embodiments, the protocol identifier is a byte e.g., a hex value 0x80. In step 414, the communication manager 114 can transmit the compressed Internet layer packet with the protocol identifier to a ground message manager via the selected one or more radios selected in the step 406.

Figure 5:
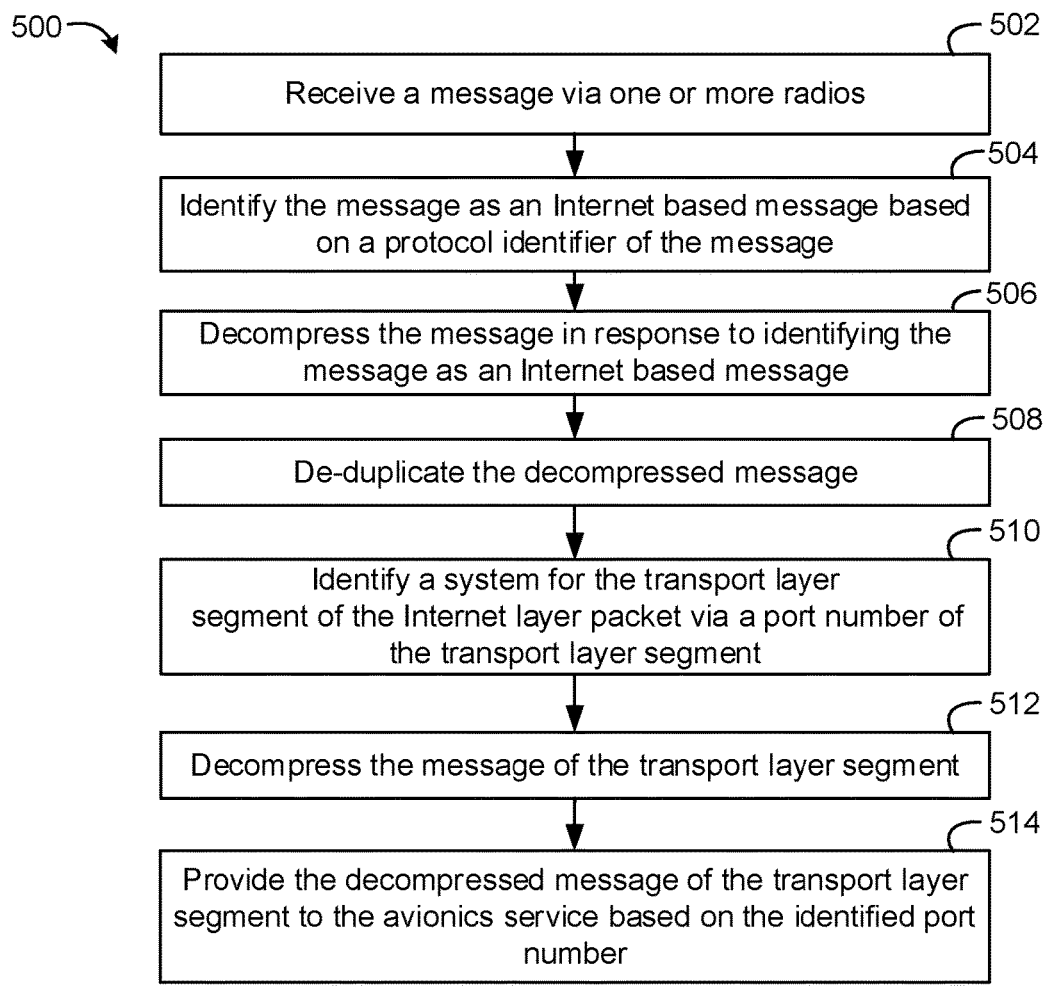
FIG. 5 is a flow diagram of a process for receiving, by the communication manager of FIG. 1, Internet based messages from the ground message manager of FIG. 1 according to exemplary aspects of the inventive concepts disclosed herein.

Referring now to FIG. 5, a process 500 is shown for receiving a message via the radios 274 of the aircraft 102 according to some exemplary embodiments. The communication manager 114 can be configured to perform the process 500. Further, any device or system described herein can be configured to perform the process 500.

In step 502, the communication manager 114 can be configured to receive a message via one or more radios (e.g., the radios 274). The message may include a protocol identifier that is appended and/or prepended to the message. In step 504, the protocol identify manager 240 can identify whether the message is an Internet message based on the protocol identifier. In some embodiments, a particular value of the protocol identifier identifies the message as an Internet based message.

In step 506, the compression manager 224 can decompress the message in response to determining that the message is an Internet based message. The message may be an Internet layer packet (e.g., similar to the Internet layer packet of the step 408 in FIG. 4). In some embodiments, decompressing the received message (e.g., an Internet layer packet) includes decompressing an Internet layer header of the Internet layer packet e.g., the Internet layer header compression manager 284 can be configured to decompress the Internet layer header. In some embodiments, the communication manager 114 receives multiple of the same messages via different radios of the radios 274. In step 508, the path manager 236 can de-duplicate the redundant messages. In some embodiments, the path manager 236 saves the first message and discards any subsequent duplicate messages it receives.

The decompressed message may be an Internet layer packet. The Internet layer packet may include a transport layer segment. The transport layer segment may include a port number that is appended or prepended to the transport layer segment or may be included in a transport layer header of the transport layer segment. In step 508, based on the port number, a particular system can be identified by the transport layer manager 228. The transport layer manager 228 may use a table e.g., a table similar to Table 1, that identifies the system (e.g., the ATC/ATS 200, the non-IP systems 204, or the native-IP system 202), that the message is destined for.

In step 512, the compression manager 224 (e.g., the application data compression manager 282) can decompress the message encapsulated as the transport layer segment. In step 514, the transport layer manager 228 can provide the decompressed message to the identified system identified in the step 508. In some embodiments, if the identified system is a native-IP system, the transport layer manager 228 can send the transport layer segment to the native-IP system. In some embodiments, the message is destined for a non-Internet based system (e.g., systems that natively utilize ACARS or ATN). In this case, the convergence function 280 and/or the dialogue service 218 and/or the ARINC interface 220 may change the format of the transport layer segment into a format that the system can received (e.g., ARINC message). The convergence manager 310 may include some and/or all of the functionality of the convergence function 280 as described with reference to FIG. 2 and can be configured to convert the message to an appropriate format. The message may be in an ASN.1 format and thus the convergence manager 310 can be configured to convert the ASN.1 formatted message to ACARS, ATN/OSI, or IP message format.

Figure 6:
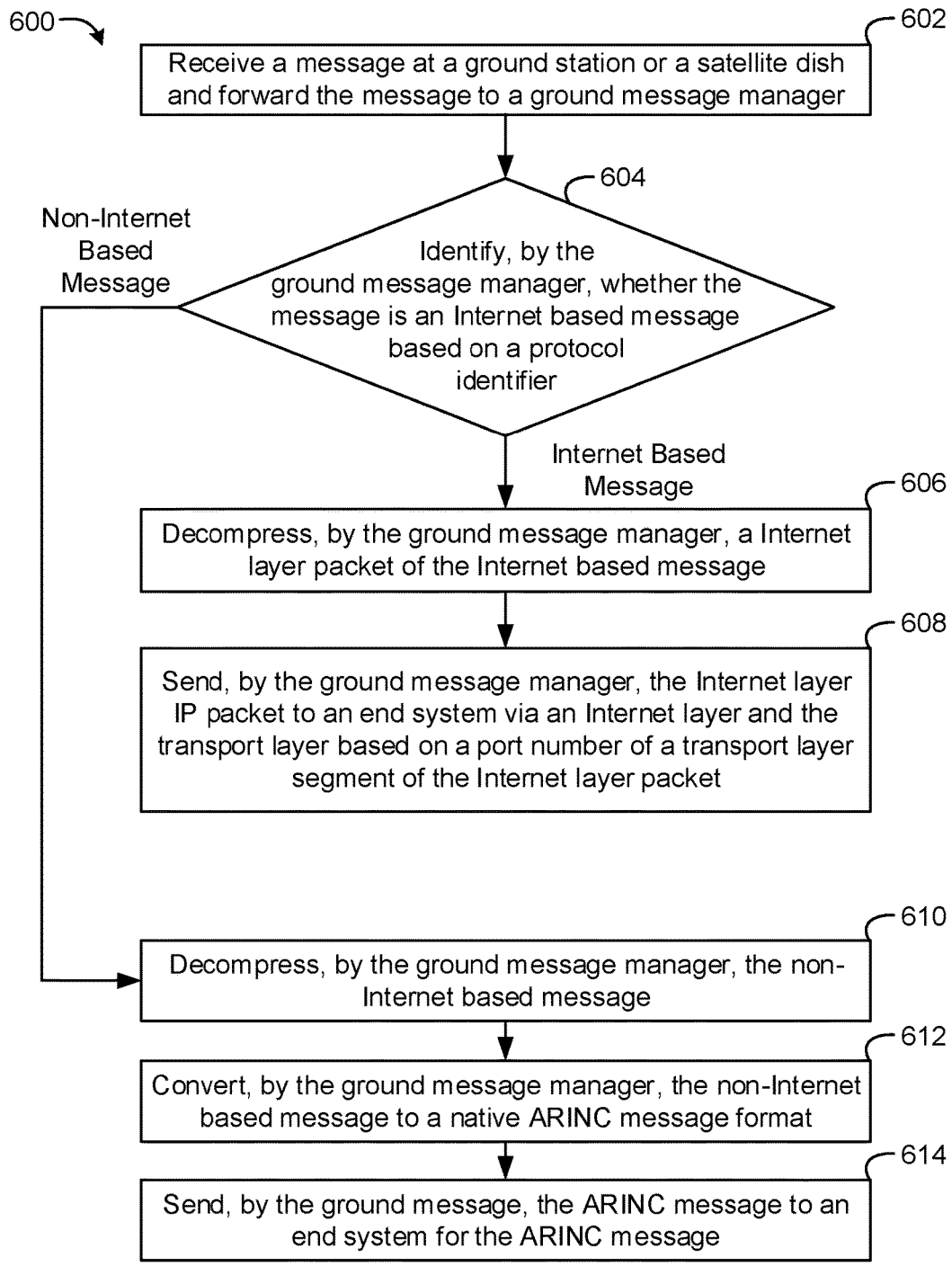
FIG. 6 is a flow diagram of a process for receiving, by the ground message manager of FIG. 1, Internet based messages from the aircraft of FIG. 1 according to exemplary aspects of the inventive concepts disclosed herein.

Referring now to FIG. 6, a process 600 for determining, by a ground station, whether a received message is an Internet based message or a non-Internet based message. The ground message manager 110 can be configured to perform the process 600. Further, any device or system described herein can be configured to perform the process 600. In step 602, the ground message manager 110 can receive a message from the aircraft 102. In step 602, the ground message manager 110 can receive the message from the ground stations 106 and/or the satellite dish 108 (e.g., the message may be transmitted by the aircraft 102 via SAT-COM, VHF, and/or HF).

In step 604, the protocol identity manager 308 of the ground message manager 110 can determine, whether the message received in the step 602 is an Internet based message based on a protocol identifier included in the received message. The protocol identifier may be a piece of data (e.g., a bit, byte) such as the hexadecimal number 0x80. If a protocol identifier is present in the received message, the protocol identifier may indicate that the received message is an Internet based message. If there is no protocol identifier in the received message, this may indicate that the message is not an Internet based message and may be an ACARS based message.

As an example, the received message may be prepended (or appended) with the protocol identifier 0x80 by the communication manager 114 of the aircraft 102 when the message is an Internet based message. Another aircraft may send a message to the ground message manager 110 but may not include the protocol identifier. The protocol identity manager 308 may identify the message received from the aircraft 102 as an Internet based message since it includes the protocol identifier 0x80. The hexadecimal number 0x80 may indicate Internet based messaging. The protocol identity manager 308 may determine that the second message received from the other aircraft is not an Internet based message since this message may lack the 0x80 header.

In step 604, in response to determining that the received message of step 602 is an Internet message, the ground message manager 110 can perform steps 606 and 608. In step 604, in response to determining that the received message of step 602 is not an Internet message, the ground message manager 110 can perform steps 610, 612, and 614.

In step 606, the compression manager 320 can decompress the Internet layer packet and/or the message included in the transport layer segment of the Internet based message. In step 608, the transport layer manager 322 and the Internet layer manager 326 can send the Internet based message to the IP end systems 112. The transport layer manager 322 and the Internet layer manager 326 may perform any transport layer functionality or Internet layer functionality necessary for sending the Internet based message to the IP end systems 112. In some embodiments, the transport layer manager 322 may use port numbers included in the transport layer segment of the Internet based message (e.g., such as the table of port numbers in Table 1) to identify one particular end system of the IP end systems 112 to send the message to.

In some embodiments, the port number of the transport layer segment identifies that the destination for the message is the ATN end system 318 or the A620 host 314. In this regard, the transport layer manager 322 may send the message (e.g., the message encapsulated in the transport layer segment) to the ATN end system 318 or the A620 host 314. The convergence manager 310 may convert the messages to a format suitable for communicating with the ATN end system 318 and/or the A620 host 314, e.g., the ARINC 620. In some embodiments, the port number of the transport layer segment indicates the communication type. For example, port number associated with AOC, FANS, etc. may indicate that the message is an ACARS message and is destined for a specific system of the system 318.

In step 610, the compression manager 320 of the convergence manager 310 can decompress the non-Internet based message. In some embodiments, the non-Internet based message is compressed and therefore the compression manager 320 can decompress the message. In some embodiments, the non-Internet message is not compressed and therefore the compression manager 320 can forego decompressing the non-Internet based message.

In step 612, the ground message manager 110 can convert the decompressed non-Internet based message to a ARINC message format (e.g., ARINC 620) if the message is not already in ARINC format. In step 614, the ground message manager 110 can send the ARINC message to end system e.g., the ATN end system 318 or the A620 host 314 or the ATN/OSI end system 118 and/or the ACARS end system 116.

Figure 7:
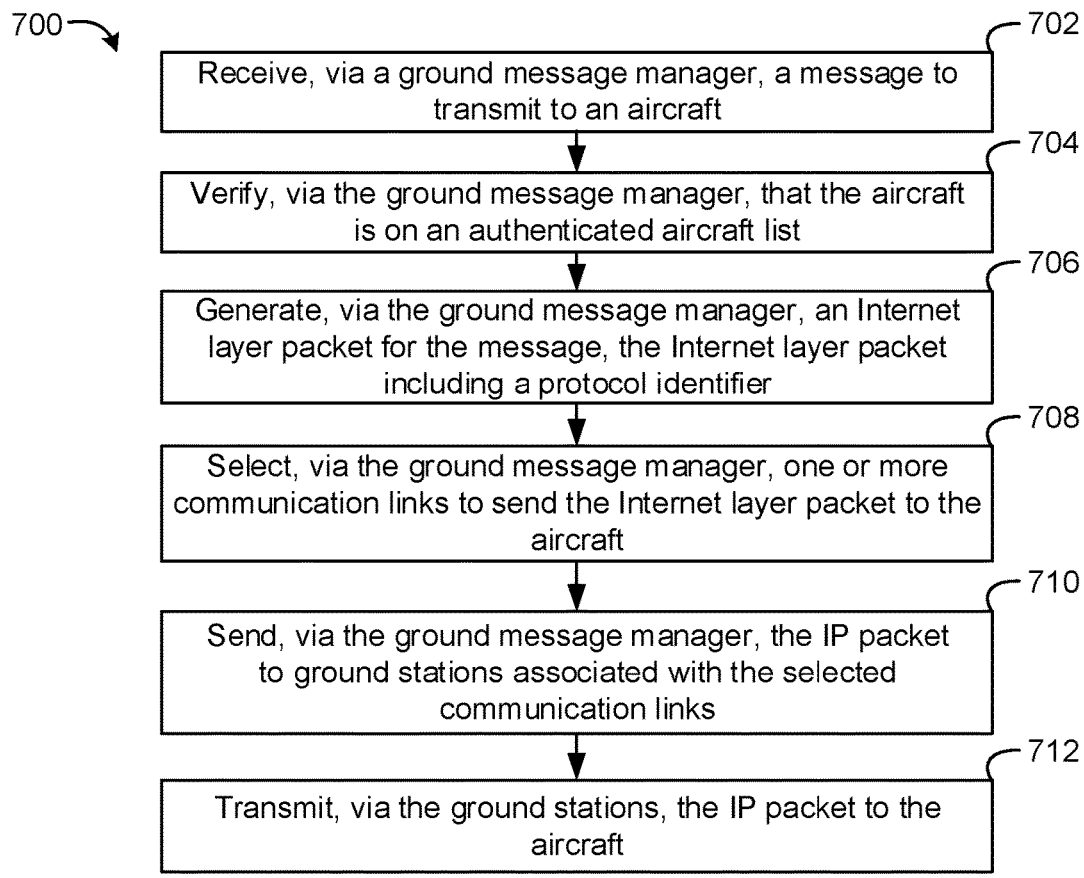
FIG. 7 is a flow diagram of a process for sending, by the ground message manager of FIG. 1, Internet based messages to the aircraft of FIG. 1 according to exemplary aspects of the inventive concepts disclosed herein.

Referring now to FIG. 7, a process 700 for sending, by the ground station 110, Internet based messages to the aircraft 102. The ground message manager 110 can be configured to perform the process 700. Further, any device or system described herein can be configured to perform the process 700.

In step 702, the ground message manager 110 can receive a message to transmit to the aircraft 102 from an end system (e.g., the IP end systems 112, the ATN end system 318, the A620 host 314). The message may indicate a destination aircraft (e.g., the aircraft 102). In step 704, the ground message manager 110 can determine that the destination aircraft is an authorized aircraft i.e., is currently on the authorized aircraft list. The list 312 may include a list of all authorized aircraft. In various embodiments, the list 312 is received and/or updated by the AAL 111. If the ground message manager 110 determines that the destination aircraft is on the list 312, the ground message manager 110 can continue performing the process 700. However, if the ground message manager 110 does not determine that the destination aircraft is not on the list 312, the ground message manager 110 may stop performing the process 700.

In step 706, the ground message manager 110 can generate an Internet layer packet for the message. The Internet layer message generated by the ground message manager 110 may include a protocol identifier. Step 706 can be performed by the protocol identity manager 308, the compression manager 320, the transport layer manger 322, the path manager 324, and the Internet layer manager 326 of the ground message manager 110. Further, the Internet layer packet may include a transport layer segment that includes a port number identifying a particular system or application of the aircraft 102 that the message is destined for. A table e.g., Table 1, can be used by the ground message manager 110 when adding the port number to the message. Step 706 may be the same or similar to the steps of process 400 as described with reference to FIG. 4. Specifically, step 706 may be the same as or similar to steps 402, 404, 408, 410, and 412 and can be performed by the ground message manager 110.

In step 708, the path manager 324 can select one or more communication links to transmit the Internet layer packet to the aircraft 102. The path manager 324 can select the one or more communication links based on load balancing. Step 708 may be similar to or the same as step 406. The path manager 324 can select a SATCOM communication link (e.g., the satellite dish 108 and the satellite 104) or a VHF communication link, an HF communication link, or any other type of radio (e.g., the ground stations 106).

In step 710, based on the selected communication links, the ground message manager 110 can send the Internet layer packet to the communication station associated with the selected communication link. For example, if the selected communication link is SATCOM, the ground message manager 110 may send the Internet layer packet to the satellite 104. If the selected communication link is VHF, found message manager may send the Internet layer packet to one of the ground stations 106 associated with a VHF communication link. In step 712, each of the ground stations (or satellite dishes) can transmit the Internet layer packet to the aircraft 102.

The scope of this disclosure should be determined by the claims, their legal equivalents and the fact that it fully encompasses other embodiments which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations. Embodiments of the inventive concepts disclosed herein may be implemented using an existing computer processor, or by a special purpose computer processor incorporated for this or another purpose or by a hardwired system.

Embodiments in the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. An aircraft with Internet based communication, the aircraft comprising:
   a plurality of communication radios configured to communicate with a ground message manager; and
   a processing circuit configured to:
      receive a message from a non-Internet system of the aircraft, the non-Internet system associated with a non-Internet communication protocol;
      store a conversion table, the conversion table linking a plurality of non-Internet services with a plurality of transport layer port numbers, the conversion table linking each of the plurality of non-Internet services with one of the plurality of transport layer port numbers;
      identify, based on the conversion table, a transport layer port number of the plurality of transport layer port numbers, the transport layer port number linked to a non-Internet service, the non-Internet system being a first system of the non-Internet service;

encapsulate the received messages into a transport layer segment with the transport layer port number identifying a non-Internet ground system corresponding to the non-Internet system, the non-Internet ground system being a second system of the non-Internet service;

encapsulate the transport layer segment into an Internet layer packet;

add a protocol identifier to the Internet layer packet, the protocol identifier indicating to the ground message manager that the Internet layer packet is an Internet based message; and send the Internet layer packet to the ground message manager via the plurality of communication radios to be delivered to the non-Internet ground system via the non-Internet communication protocol.

2. The aircraft of claim 1, wherein the plurality of communication radios comprise very high frequency (VHF) radios, satellite communication (SATCOM) radios, and high frequency (HF) radios.

3. The aircraft of claim 1, wherein the processing circuit is configured to:
compress the message received from the non-Internet system; and
encapsulate the compressed message into the transport layer segment with the transport layer port number.

4. The aircraft of claim 1, wherein the processing circuit is configured to:
compress the Internet layer packet; and
add the protocol identifier to the compressed Internet layer packet.

5. The aircraft of claim 1, wherein the processing circuit is configured to:
select two or more of the plurality of communication radios; and
send the Internet layer packet to the ground message manager via the selected two or more communication radios.

6. The aircraft of claim 1, wherein the processing circuit is configured to:
receive, via one or more of the plurality of communication radios, a second Internet layer packet from the ground message manager, the second Internet layer packet comprising the protocol identifier; and
identify the second Internet layer packet as the Internet based message based on the protocol identifier.

7. The aircraft of claim 6, wherein the processing circuit is configured to:
decompress the second Internet layer packet in response to identifying the Internet layer packet as the Internet based message;
identify the non-Internet system based on the transport layer port number included in the second Internet layer packet, the transport layer port number being associated with the non-Internet system of the aircraft;
decompress a second message of a second transport layer segment of the Internet layer packet; and
send the second message of the second transport layer segment to the non-Internet system.

8. The aircraft of claim 7, wherein the processing circuit is configured to:
receive one or more duplicates of the second Internet layer packet via the plurality of communication radios, wherein each of the one or more duplicates is received via a separate communication radio of the plurality of communication radios; and
de-duplicate the second Internet layer packet and the one or more duplicates of the second Internet layer packet by:
identifying that the one or more duplicates of the second Internet layer packet are duplicates of the second Internet layer packet; and
discarding the identified one or more duplicates of the second Internet layer packet.

9. A method for Internet based communication for an aircraft, the method comprising:
receiving a message from a non-Internet system of the aircraft, the non-Internet system associated with a non-Internet communication protocol;
storing a conversion table, the conversion table linking a plurality of non-Internet services with a plurality of transport layer port numbers, the conversion table linking each of the plurality of non-Internet services with one of the plurality of transport layer port numbers;
identifying, based on the conversion table, a transport layer port number of the plurality of transport layer port numbers, the transport layer port number linked to a non-Internet service, the non-Internet system being a first system of the non-Internet service;
encapsulating the received messages into a transport layer segment with the transport layer port number identifying a non-Internet ground system corresponding to the non-Internet system, the non-Internet ground system being a second system of the non-Internet service;
encapsulating the transport layer segment into an Internet layer packet;
adding a protocol identifier to the Internet layer packet, the protocol identifier indicating to a ground message manager that the Internet layer packet is an Internet based message; and
sending the Internet layer packet to the ground message manager via a plurality of communication radios to be delivered to the non-Internet ground system via the non-Internet communication protocol.

10. The method of claim 9, further comprising:
compressing the message received from the non-Internet system of the aircraft; and
encapsulating the compressed message into the transport layer segment with the transport layer port number.

11. The method of claim 9, further comprising:
compressing the Internet layer packet; and
adding the protocol identifier to the compressed Internet layer packet.

12. The method of claim 9, further comprising:
selecting two or more of the plurality of communication radios; and
sending the Internet layer packet to the ground message manager via the selected two or more communication radios.

13. The method of claim 9, further comprising:
receiving, via one or more of the plurality of communication radios, a second Internet layer packet from the ground message manager, the second Internet layer packet comprising the protocol identifier; and
identifying the second Internet layer packet as the Internet based message based on the protocol identifier.

14. The method of claim 13, further comprising:
decompressing the second Internet layer packet in response to identifying the Internet layer packet as the Internet based message;

identifying the non-Internet system based on the transport layer port number included in the Internet layer packet, the transport layer port number being associated with the non-Internet system;
decompressing a second message of second transport layer segment of the Internet layer packet; and
sending the second message of the transport layer segment to the non-Internet system.

15. The method of claim 14, further comprising:
receiving one or more duplicates of the second Internet layer packet via the plurality of communication radios, wherein each of the one or more duplicates is received via a separate communication radio of the plurality of communication radios; and
de-duplicating the second Internet layer packet and the one or more duplicates of the second Internet layer packet by:
identifying that the one or more duplicates of the second Internet layer packet are duplicates of the second Internet layer packet; and
discarding identified duplicates of the second Internet layer packet.

16. A communication system of an aircraft, the communication system comprising:
a plurality of communication radios configured to communicate with a ground message manager; and
a processing circuit configured to:
receive a message from a non-Internet system of the aircraft, the non-Internet system associated with a non-Internet communication protocol;
store a conversion table, the conversion table linking a plurality of non-Internet services with a plurality of transport layer port numbers, the conversion table linking each of the plurality of non-Internet services with one of the plurality of transport layer port numbers;
identify, based on the conversion table, a transport layer port number of the plurality of transport layer port numbers, the transport layer port number linked to a non-Internet service, the non-Internet system being a first system of the non-Internet service;
compress the message received from the non-Internet system of the aircraft;
encapsulate the compressed message into a transport layer segment with the transport layer port number identifying a non-Internet ground system corresponding to the non-Internet system, the non-Internet ground system being a second system of the non-Internet service;
encapsulate the transport layer segment into an Internet layer packet;
compress the Internet layer packet;
add a protocol identifier to the compressed Internet layer packet, the protocol identifier indicating to the ground message manager that the Internet layer packet is an Internet based message; and
send the Internet layer packet to the ground message manager via the plurality of communication radios to be delivered to the non-Internet ground system via the non-Internet communication protocol.

17. The communication system of claim 16, further comprising the ground message manager, wherein the ground message manager comprises a second processing circuit configured to:
receive a second message from a ground system;
encapsulate the received second message into a second transport layer segment;
encapsulate the second transport layer segment into a second Internet layer packet;
add the protocol identifier to the second Internet layer packet, the protocol identifier indicating to the ground message manager that the second Internet layer packet is a second Internet based message; and
send the second Internet layer packet to the aircraft via a plurality of communication links.

18. The communication system of claim 17, wherein the second processing circuit of the ground message manager is configured to:
compress the second message received from the ground system;
encapsulate the compressed second message into the second transport layer segment;
compress the second Internet layer packet; and
add the protocol identifier to the compressed second Internet layer packet.

19. The communication system of claim 18, wherein the processing circuit of the aircraft is configured to:
receive, via one or more of the plurality of communication radios, the second Internet layer packet from the ground message manager, the second Internet layer packet comprising the protocol identifier; and
identify the second Internet layer packet as the second Internet based message based on the protocol identifier.

20. The communication system of claim 19, wherein the processing circuit of the aircraft is configured to:
decompress the second Internet layer packet in response to identifying the second Internet layer packet as the second Internet based message;
identify the non-Internet system of the aircraft based on a port number included in the Internet layer packet, the port number being associated with the non-Internet system of the aircraft;
decompress the second message of the second transport layer segment of the second Internet layer packet; and
send the decompressed second message of the second transport layer segment to the non-Internet system.

* * * * *